Aug. 18, 1942.  J. C. SUTTON  2,293,572
BATHROOM SCALE
Filed June 16, 1938  4 Sheets-Sheet 1
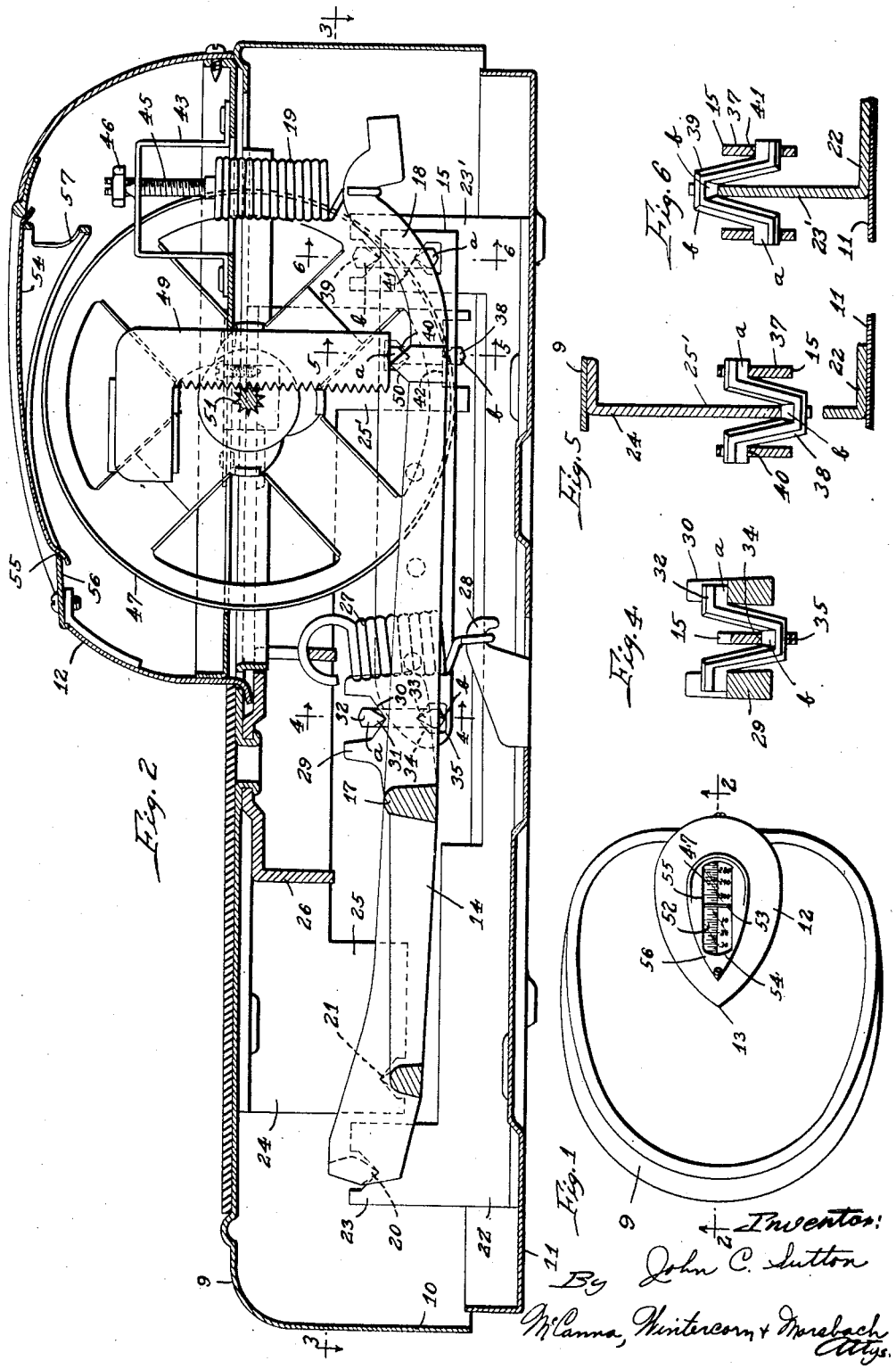

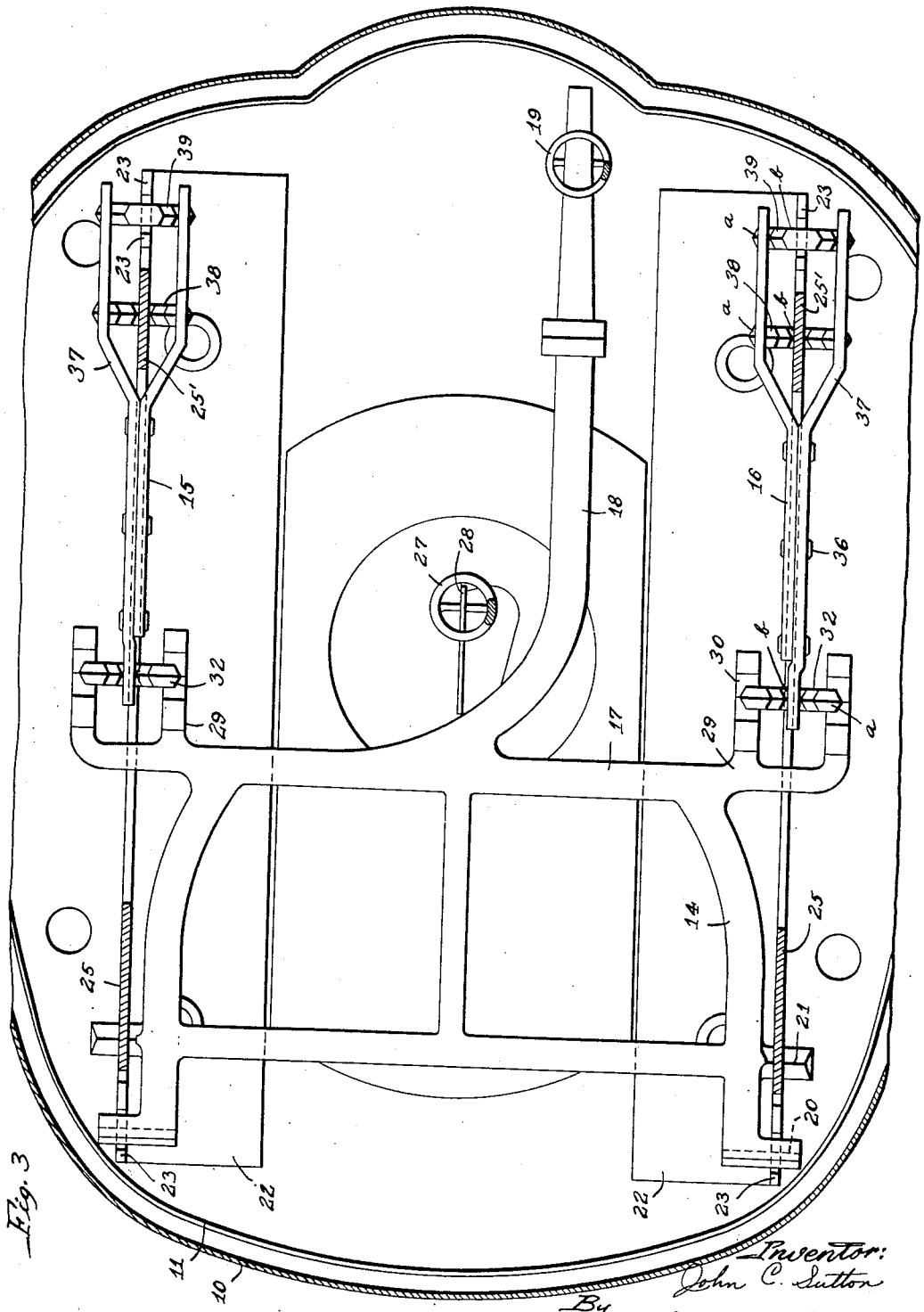

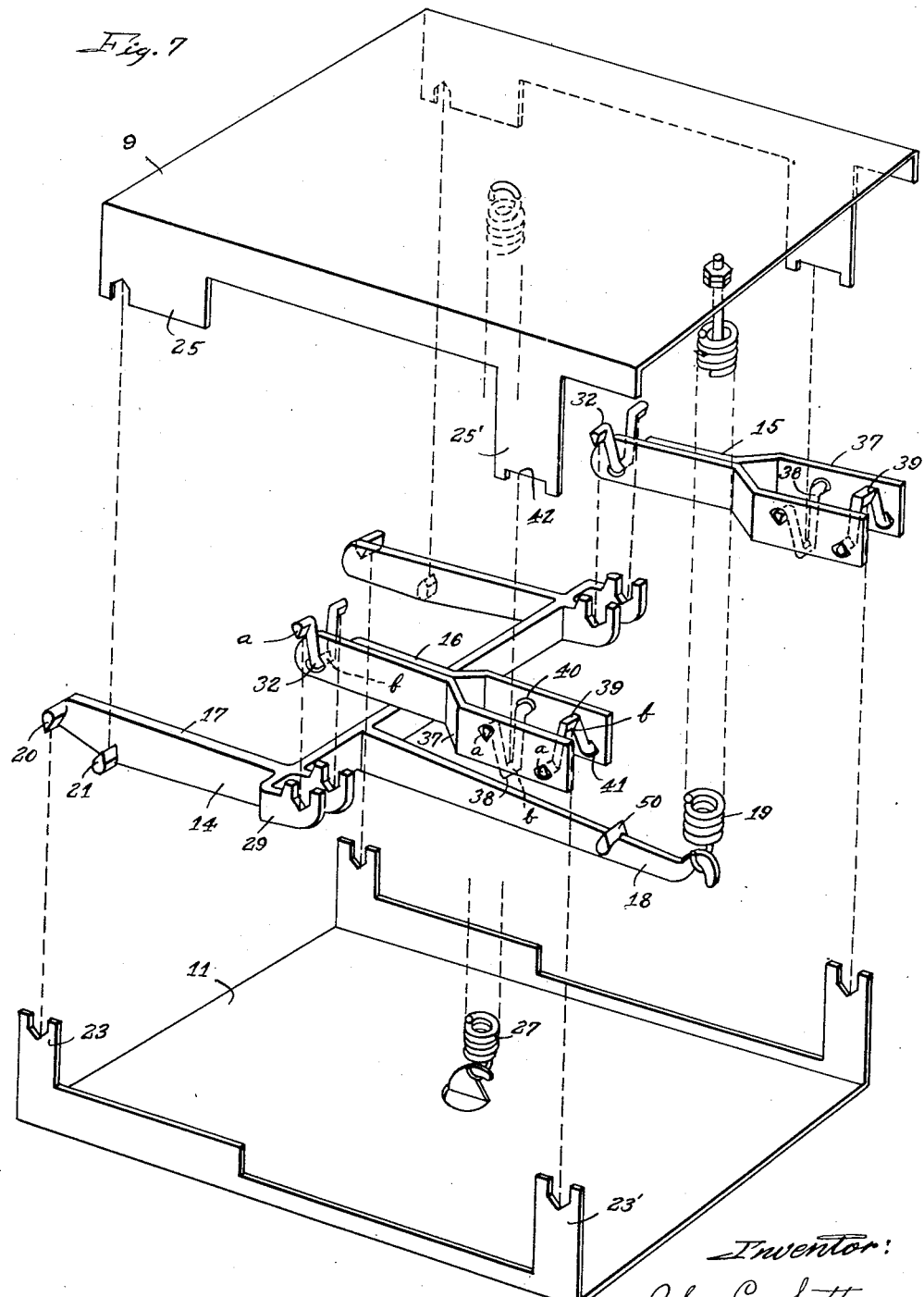

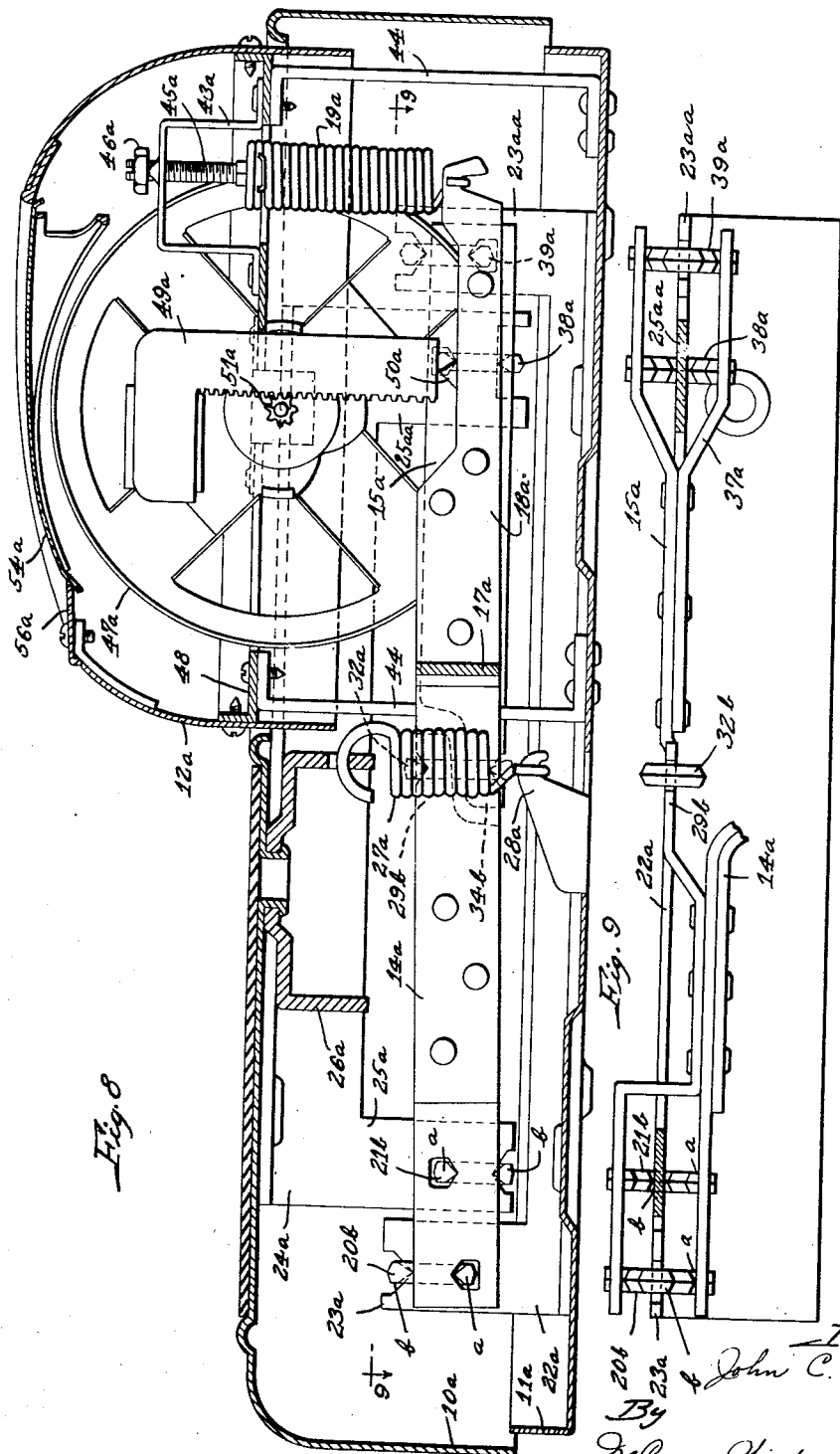

Patented Aug. 18, 1942

2,293,572

UNITED STATES PATENT OFFICE 2,293,572

BATHROOM SCALE

John C. Sutton, Rockford, Ill., assignor to The Brearley Company, Rockford, Ill., a corporation of Illinois Application June 16, 1938, Serial No. 214,068

15 Claims. (Cl. 265—68)

This invention relates to weighing scales, and more particularly bathroom type scales.

Bathroom scales were formerly made of heavy cast construction to obtain the desired rigidity of the members necessary for accuracy. More recently, the scales have been of sheet metal construction, and it has always been a problem to obtain the desired rigidity, because any distortion in the scale, brought about, for example, by using it on an uneven floor or standing on the scale off center, would make for inaccurate reading. In fact, most scale manufacturers take special pains to instruct the purchaser to be sure to place the scale on an even floor and stand on the middle of the platform for best results. It is therefore the principal object of my invention to provide a scale the platform supporting levers of which are flexibly mounted between the platform and base and can therefore change positions to suit the distortion of the base, so that good operation is assured under the adverse conditions mentioned, where other scales of conventional construction would not perform satisfactorily.

Another objection to bathroom scales as heretofore constructed was that it was awkward to move them from one place to another because of the platform's floating relationship to the base, the same having such a loose jointed connection with the base that one could hardly move the scale without being careful to lift it by means of the base. It is therefore another highly important object of my invention to provide a scale in which spring means is provided, independent of the weighing spring means, for urging the platform normally toward the base under sufficient spring tension to keep the knife edges of the levers therebetween solidly engaged with their fulcrums, whereby to eliminate the objectionable loose jointed characteristic mentioned and permit one to lift and carry the scale by means of the platform, or in any other way desired, as one solid unit, without the objectionable clattering and jangling noise usually incident to such a performance. This auxiliary spring means is preferably in the form of a single tension spring connected between the platform and base at a central point so as to have a substantially uniform tensioning effect upon all of the knife edges in equally spaced relation on opposite sides thereof, and it is so related to the weighing spring means that as the latter is loaded when weight is applied to the platform, the auxiliary spring is unloaded, and vice versa.

Another objection to scales of conventional construction has been that unless the supporting projections extending upwardly from the base and downwardly from the platform were all accurately spaced laterally and longitudinally with respect to one another to conform with the spacing of the knife edges on the supporting levers, the scale would not weigh accurately, due to sliding friction and binding action set up between the parts. It is therefore still another important object of my invention to provide a scale having swing bearings at all or most of the fulcrum points, the lateral and longitudinal freedom of which make for greater accuracy and sensitiveness by eliminating the objectionable rubbing and binding action.

The invention is illustrated in the accompanying drawings, in which—

Fig. 1 is a plan view of a bathoom scale made in accordance with my invention;

Fig. 2 is a longitudinal section on the line 2—2 of Fig. 1 on a larger scale;

Fig. 3 is a horizontal section on the line 3—3 of Fig. 2;

Figs. 4, 5, and 6 are sectional details on the correspondingly numbered lines of Fig. 2;

Fig. 7 is an exploded diagrammatic view to better illustrate the relationship of the various parts of the lever mechanism and their swing bearings to the platform and base, as well as the relationship of the two spring means to the parts named;

Fig. 8 is a view similar to Fig. 2, showing use of the swing type bearings throughout, and Fig. 9 is a fragmentary section showing a top view of one-half of the swing bearings, taken on line 9—9 of Fig. 8.

Similar reference numerals are applied to corresponding parts throughout the views.

Referring first mainly to Figs. 1 to 3, 9 designates the sheet metal platform of inverted cupped form providing depending side walls 10 enclosing the base 11 which is also of cupped sheet metal construction. 12 is a dial housing preferably of stream-line form disposed in the longitudinal median plane of the platform with its pointed end 13 to the rear leaving ample foot room on opposite sides thereof. In place of the usual wishbone levers for supporting the platform on the base, I provide, in accordance with the present invention, a main lever 14 and two secondary levers 15 and 16. The lever 14 is generally wishbone shaped providing the forked portion 17 on the rear end of the arm 18 which extends longitudinally with respect to the base 11 toward the front end thereof for connection with the weighing spring 19. Each branch of the forked portion 17 has a downwardly facing knife edge 20 on the rear end thereof and an upwardly facing knife edge 21 in forwardly spaced relation thereto. Angular sheet metal pieces 22 are suitably secured to the base 11 in parallel longitudinal relationship and have upward projections 23 on the rear ends thereof to serve as fulcrums for the knife edges 20. Other angular sheet metal pieces 24 are secured to the under side of the platform 9 in parallel longitudinal relationship and have downward projections 25 on the rear ends thereof affording fulcrums for engagement with the knife edges 21, as shown. A transverse brace 26 of sheet metal channel construction is also secured to the under side of the platform 9 and suitably interlocked at the opposite ends with the pieces 24 to reenforce the platform and also provide a place for anchoring the upper end of the coiled tension spring 27, the lower end of which is anchored to the base 11 on a hook-shaped upward projection 28, as shown. Two forked projections 29 are provided on the opposite sides of the forked portion 17 of the wishbone lever 14, each providing transversely aligned fulcrums 30 for the downwardly facing knife edges $a$ of a swing bearing 32. Each of the swing bearings 32 is cast to provide a middle upwardly facing knife edge $b$ in downwardly offset relation to the knife edges $a$ adapted to cooperate with a fulcrum 34 provided in a hole 35 in the rear end of the associated lever 15 or 16, as the case may be. Each of the levers 15 and 16 is formed from two straps of sheet metal riveted together, as indicated at 36, and bent apart at the forward end to form a fork 37 in which two swing bearings 38 and 39, like the swing bearings 32, are loosely assembled and fulcrumed in holes 40 and 41. Each of the bearings 38 has its middle knife edge $b$ facing upwardly to engage the downward projection 25' serving as a fulcrum on the front end of the associated angular sheet metal piece 24, previously mentioned. Each of the swing bearings 39 has its middle knife edge $b$ facing downwardly for fulcrum engagement with an upward projection 23' on the front end of the associated angular piece 22, previously mentioned.

A scale constructed along these lines is free from the objectionable binding action and sliding friction common in other constructions, because it is obvious that the two projections 23 are all that determine the relationship of the wishbone lever 14 with respect to the base 11 by engagement of the knife edges 20. Hence there can be no binding or rubbing to interfere with accurate weighing in so far as this portion of the scale is concerned. In like manner, the two projections 25 determine the relationship of the platform 9 with respect to the lever 14 by engagement with the knife edges 21, so that binding and rubbing is eliminated. The levers 15 and 16, due to the swing bearings 32, 38 and 39, are free to shift longitudinally and laterally to compensate for any irregularity there may be in regard to the longitudinal or lateral spacing of the upward projections 23' with respect to the related projections 23 or downward projections 25' with respect to their related projections 25. That is, if either of the upward projections 23' is closer to or farther away from the associated projection 23 than it should be, the swing bearing 39 assumes a slightly cocked position at a small angle with respect to the vertical position it would otherwise have. In the event the upward projections 23' are closer together or farther apart than standard specifications call for, one or both of the levers 15 and 16 is free to swing transversely on the bearings 32, 38 and 39 to compensate for the irregularity, that is, if there isn't sufficient play sidewise of the bearings 32, 38, and 39 to take care of the irregularity. Usually the scale parts will adhere closely enough to a standard so that if one of the bearings 39 is jogged sidewise one way a trifle and the other related bearing 39 is jogged sidewise in the opposite direction a trifle, it will be enough to allow for a normal amount of "run out." Each related pair of swing bearings 32 and 39 will take their positions according to the spaced relationship between the forked projection 29 and the upward projection 23' on which these two swing bearings are swingably supported. The intermediate related swing bearing 38 gravitates to a vertical position and its upwardly facing knife edge $b$ engages the elongated flat horizontal bearing surface 42 provided therefor on the lower end of the downward projection 25', the elongation being enough to compensate for any deviation lengthwise in either direction of the associated lever 15 or 16 from a given position. It is apparent, therefore, that no binding or rubbing can occur anywhere to interfere with accurate weighing. Now, of course, such a construction would result in objectionable wabbliness if the scale were otherwise of conventional construction, because, as previously stated, even the conventional scale with two fairly rigid wishbone levers disposed in the conventional manner between the platform and base gave rise to the objection that the platform was so loosely connected with the base that one could not readily pick up the scale and carry it from one place to another, and care had to be exercised to pick up the scale by its base. The present self-aligning construction is made feasible by the provision of the auxiliary spring 27 in addition to the weighing spring 19. This auxiliary spring has the sole function of keeping the scale parts under spring tension at all times. It urges the platform 9 toward the base 11 and, being centrally located with respect to all of the knife edges and cooperating fulcrums, as clearly appears in Figs. 2, 3 and 7, it is obvious that the spring pressure is substantially uniformly distributed to all of the knife edges. The spring tension is heavy enough so that one may lift the scale by means of the platform without the usual noticeable lost-motion connection between the base and platform; the base will lift with the platform as one unit, and there is nothing of a loose jointed nature about the assembly. The combined effect of the self-aligning supporting levers and the spring tensioning means is that one may stand on the platform 9 well to one side of center and still the scale will weigh accurately. Apparently this is partly due to the fact that all of the knife edges remain in contact with their associated fulcrums under the spring tension and partly due to the fact that when weight is applied to one side of the platform, the levers 15 and 16 shift relative to one another with the swing bearings 32, 38 and 39 to compensate for the distortion in the platform 9 or base 11, or both. The soundness of the self-aligning principle and spring tensioning principle has been amply demonstrated by tests to leave no room for doubt that these two features when used together eliminate the errors in weighing traceable either to inaccurate manufacture in the first instance or distortion of the scale parts due to uneven floors or careless application of weight to one side or the other from the center of the platform.

When weight is applied to the platform 9, the lever 14 is forced downwardly both by the load imposed directly thereon by the downward projections 25 and under the load transmitted through the levers 15 and 16 to the lever 14. The weighing spring 19 which is shown in Fig. 2 as supported on a bracket 43 on the platform 9 but may be supported like bracket 43a in Fig. 8 on upwardly projecting brackets 44 on the base 11, is stretched simultaneously with the contraction of the spring 27. Since the spring 27 is a subtracting force, the spring 19 is proportionately heavier than what would otherwise be employed. The screw 45 and adjusting nut 46 are for setting the scale to a zero reading of dial 47. The latter is here shown as supported on the platform 9, but in Fig. 8 dial 47a is carried on a support 48 rigid with the bracket 44 that supports the weighing spring in that construction. The adjusting screw and nut 45—46 should not require adjustment by the user, owing to the fact that the construction disclosed here operates with so little friction, and it was apparently the variation in frictional drag on the various parts of the mechanism in other scale constructions which necessitated resetting back to zero when the scale, after a certain amount of service, would either "wear in" and operate with less friction, or develop more friction, and accordingly fail to return to zero, as originally set. A rack 49 rests at its lower end on a transverse knife edge 50 on the arm 18 and gravitates as the lever 14 is forced downwardly in the application of weight to the scale, thereby turning the dial 47 by means of the pinion 51 which meshes with the rack 49. The dial 47 carries the usual weight graduations on the periphery thereof, as indicated at 52 in Fig. 1, and there is a hairline 53 on the window 54 to cooperate with the dial graduations in reading the weight, the window 54 being suitably secured in an opening 55 provided in a face plate 56 that is suitably removably secured in place in the top of the dial housing 12. The opening indicated at 57 provided in the vertical wall of the depressed forward end portion of the plate 56 may serve as a window for admitting light from an electric light bulb (not shown) enclosed within the housing 12 and arranged to have an electric circuit completed therethrough automatically whenever weight is applied to the platform 9, similarly as described in my copending application Serial No. 149,394, filed June 21, 1937.

In the scale shown in Fig. 8, there is, in addition to the differences to which attention has already been called, the use of swing bearings 20b and 21b taking the place of the knife edges 20 and 21, respectively, (Fig. 2), and the use of loop type swing bearings 32b, taking the place of the forked type swing bearings 32 of Fig. 2, cooperating with the notched extensions 29b and 34b on levers 14a and 15a, respectively. The object of this use of swing bearings throughout the lever mechanism is to eliminate still further the objections incident to the use of rigid knife edges and accordingly obtain still greater accuracy in weighing. Obviously, with such a construction, slight "run out" in manufacture cannot result in any binding or rubbing of parts, and if there is any distortion of the base due to an uneven floor, or any distortion of the platform due to uneven application of weight, the scale will nevertheless weigh accurately, because the lever mechanism is so flexible and is self-aligning and the spring tensioning means keeps all of the parts under sufficient spring tension to keep them from getting out of operative position. In passing, it will be observed that all other parts of the scale closely resembling the parts of the other scale have been numbered correspondingly, as, for example, base 11a corresponds to base 11, etc. Dial housing 12a in this scale is carried on the same support 48 on which the dial 47a is carried, the support 48 being rigid with the base 11a. The platform 9a moves up and down relative to the dial housing, as indicated.

It is believed the foregoing description conveys a good understanding of the objects and advantages of my invention. The appended claims are drawn with a view to covering all legitimate modifications and adaptations.

I claim:

1. In a weighing scale, a base, a platform, a wishbone lever having the two branched fork thereof disposed under one end portion of the platform with the arm thereof extending longitudinally toward the other end portion of the platform, each branch of the forked portion having a downwardly facing knife edge on the end thereof and an upwardly facing knife edge in longitudinally spaced relation thereto for engagement on upward and downward fulcrum projections provided on the base and platform, respectively, two floating levers under opposite sides of the platform in approximate fore and aft alignment with the last named fulcrum projections, two extensions on opposite sides of the forked portion of the wishbone lever in approximate alignment with the adjacent ends of the floating levers, swingable bearing members swingably supporting the last named ends of the floating levers on the two extensions of the wishbone lever, two swingable bearing members on the other end of each of the floating levers in fore and aft spaced relation, upward fulcrum projections on the base having engagement with the endmost swingable bearing members, downward fulcrum projections on the platform having engagement with the other swingable bearing members, counterpoising means operatively connected with the arm of the wishbone lever to resist movement thereof under weight imposed on the platform, and weight indicating means indicating the extent of movement of said lever.

2. In a weighing scale, a base, a platform, a wishbone lever having the two branched fork thereof under one end portion of the platform and the arm thereof extending longitudinally toward the other end portion of the platform, there being an upward fulcrum projection provided on the base adjacent the end of each of said branches and a downward fulcrum projection on the platform in longitudinally spaced relation to the upward projection, swingable bearing members swingably supporting the ends of the two branches on the upward fulcrum projections on the base, other swingable bearing members swingably supporting the downward fulcrum projections on the platform on the two branches, two floating levers under opposite sides of the platform in approximate fore and aft alignment with the last named fulcrum projections, two extensions on opposite sides of the forked portion of the wishbone lever in approximate alignment with the adjacent ends of the floating levers, swingable bearing members swingably supporting the last named ends of the floating levers on the two extensions of the wishbone lever, two swingable bearing members on the other end of each of the floating levers in fore and aft spaced relation, upward fulcrum projections on the base having engagement with the endmost swingable bearing members, downward fulcrum projections on the platform having engagement with the other swingable bearing members, counterpoising means operatively connected with the arm of the wishbone lever to resist movement thereof under weight imposed on the platform, and weight indicating means indicating the extent of movement of said lever.

3. In a scale, in combination, a platform, a base, a platform supporting lever between the platform and base, and a swingable knife edged bearing member adapted for supporting said platform on said lever, said bearing member comprising a generally U-shaped body having the cross portion of the U formed to provide a transverse knife edge facing upwardly for engagement under means on said platform, and having outwardly projecting bearing portions on the ends of arms of the U transversely aligned with respect to one another and formed to provide knife edges parallel to the knife edge aforesaid and facing downwardly for engagement with means supported by said base.

4. In a scale, in combination, a platform, a base, a platform supporting lever between the platform and base, and a swingable knife edged bearing member adapted for supporting said platform on said base, said bearing member comprising a generally U-shaped one-piece body having the cross portion of the U formed to provide a transverse knife edge facing downwardly for engagement on means on the base, and having outwardly projecting bearing portions on the ends of arms of the U transversely aligned with respect to one another and formed to provide knife edges parallel to the knife edge aforesaid and facing upwardly for engagement with means supporting the platform.

5. A weighing scale comprising a base, a platform lever mechanism for movably supporting the platform on the base, said lever mechanism having two pairs of upwardly and downwardly facing rigid knife edge portions for engagement with two pairs of rigid fulcrums projecting upwardly from the base and downwardly from the platform at two corners at one end of the platform, said lever mechanism including two longitudinally disposed floating levers movable endwise in a fore and aft direction substantially horizontally longitudinally relative to the base under the other two corners of the platform, swingable bearing members interposed between the floating levers and the rest of the lever mechanism and between the floating levers and the base and between the floating levers and the platform, and weighing spring means restraining movement of the lever mechanism.

6. In a scale, in combination, a platform, a base, a platform supporting lever between the base and platform, an auxiliary platform supporting lever in floating relation to the first named lever, and three swingable knife-edged bearing members adapted to support the auxiliary lever on the first lever and on said base and to support the platform on the auxiliary lever intermediate the ends thereof, each of said bearing members comprising a generally U-shaped body having the cross-portion of the U formed to provide a transverse knife-edge facing in the direction of the ends of the arms of the U and having outwardly projecting bearing portions on the ends of said arms transversely aligned with respect to one another and formed to provide knife edges parallel to the first named knife-edge and facing in the direction of the cross-portion of the U, one end of said auxiliary lever being supported by a swingable bearing member on the first lever, one of said levers being slung on the cross-portion of said swingable bearing member and the outwardly projecting bearing portions of said bearing member being slung on the other of said levers, the other end of said auxiliary lever being slung on the outwardly projecting bearing portions on a second swingable bearing member whose cross-portion is slung on the base, and the third swingable bearing member having its outwardly projecting bearing portions slung on the auxiliary lever intermediate the ends thereof and the platform being slung on the cross-portion of said bearing member.

7. In a scale, in combination, a platform, a base, a platform supporting lever between the base and platform, an auxiliary platform supporting lever in floating relation to the first named lever, and three swingable knife-edged bearing members adapted to support the auxiliary lever on the first lever and on said base and to support the platform on the auxiliary lever intermediate the ends thereof, each of said bearing members comprising a generally U-shaped body having the cross-portion of the U formed to provide a transverse knife-edge facing in the direction of the ends of the arms of the U and having outwardly projecting bearing portions on the ends of said arms transversely aligned with respect to one another and formed to provide knife edges parallel to the first named knife edge and facing in the direction of the cross-portion of the U, two of said swing bearings being disposed at opposite ends of the auxiliary lever and swingably supporting said ends relative to the first lever and base, and the third swingable bearing being disposed intermediate the ends of said auxiliary lever and providing swingable support for the platform relative to said auxiliary lever.

8. In a bathroom type scale, the combination of a base, a sheet metal platform subject to torque distortion when weight is unevenly applied thereon, a wishbone type supporting lever having the two-branched fork thereof disposed under the rear portion of the platform and the arm thereof extending forwardly under the front portion of the platform, transversely aligned fixed fulcrums projecting upwardly from the base and engaged by transversely aligned downwardly facing knife edge projections on the rear end of the wishbone lever, said lever having transversely aligned upwardly facing knife edge projections in forwardly spaced relation to the first named knife edge projections, transversely aligned fixed fulcrums projecting downwardly from the platform for engagement with the last named knife edge projections, said platform having two other transversely aligned fulcrums projecting downwardly therefrom in forwardly spaced relation to its first named fulcrums but subject to misalignment under torque distortion of the platform, and two other levers each supported at one end on the base and at the opposite end on the wishbone lever with freedom to float endwise relative to the base and wishbone lever in a fore and aft direction substantially horizontally, means providing floating bearing support for each of the forward fulcrums of said platform on said floating levers, weighing spring means operatively connected with the arm of the wishbone lever to resist movement thereof under weight imposed on the platform, and weight indicating means indicating the extent of movement of said lever.

9. A portable, hand-carryable weighing scale of the bathroom type comprising a light sheet metal base of shallow configuration, a weight receiving platform over said base of light sheet metal construction having depending side walls enclosing said base so that the scale when lifted and carried is taken hold of mainly by the platform, weighing mechanism comprising substantially horizontally extending lever means fulcrumed on said base and carrying said platform thereon, yielding means operatively connected to resist tilting movement of said lever means under weight applied on said platform, weight indicating means operable in response to movement of the lever means, and a single tension spring centrally arranged with respect to the platform and base and interconnecting the same under tension for the two-fold purpose of holding the platform resiliently in operative relation to the lever means at all times and holding the scale assembly as a whole intact when the scale is lifted by its platform, said weight receiving platform because of its light sheet metal construction being subject to torque distortion when weight is unevenly applied thereon, and said lever means including a wishbone lever with non-floating fulcrums fulcruming the same on the base and fulcruming the platform on the lever, and one or more other levers having laterally floatable swing type fulcrum supports for floatingly supporting other portions of the platform relative to the base, said tension spring means maintaining said swing type fulcrum supports normally in vertical dead-center positions.

10. A portable, hand-carryable weighing scale of the bathroom type comprising a light sheet metal base of shallow configuration, a weight receiving platform over said base of light sheet metal construction having depending side walls enclosing said base so that the scale when lifted and carried is taken hold of mainly by the platform, weighing mechanism comprising substantially horizontally extending lever means fulcrumed on said base and carrying said platform thereon, yielding means operatively connected to resist tilting movement of said lever means under weight applied on said platform, weight indicating means operable in response to movement of the lever means, and a single tension spring centrally arranged with respect to the platform and base and interconnecting the same under tension for the two-fold purpose of holding the platform resiliently in operative relation to the lever means at all times and holding the scale assembly as a whole intact when the scale is lifted by its platform, said weight receiving platform because of its light sheet metal construction being subject to torque distortion when weight is unevenly applied thereon, and said lever means including levers having laterally floatable swing type fulcrum supports for floating support of portions of said platform with relation to the base, said tension spring means maintaining said swing type fulcrum supports normally in vertical dead-center positions.

11. In a bathroom type scale, the combination of a base, a sheet metal platform subject to torque distortion when weight is unevenly applied thereon, a wishbone type supporting lever having the two-branched fork thereof disposed under the rear portion of the platform and the arm thereof extending forwardly under the front portion of the platform, transversely aligned fixed fulcrums projecting upwardly from the base and engaged by transversely aligned downwardly facing knife edge projections on the rear end of the wishbone lever, said lever having transversely aligned upwardly facing knife edge projections in forwardly spaced relation to the first named knife edge projections, transversely aligned fixed fulcrums projecting downwardly from the platform for engagement with the last named knife edge projections, said platform having two other transversely aligned fulcrums projecting downwardly therefrom in forwardly spaced relation to its first named fulcrums but subject to misalignment under torque distortion of the platform, and two other levers each supported on a sling at one end on the base and on another sling at the opposite end on the wishbone lever with freedom to float endwise relative to the base and wishbone lever in a fore and aft direction substantially horizontally, other sling means providing support for each of the forward fulcrums of said platform on said floating levers, weighing spring means operatively connected with the arm of the wishbone lever to resist movement thereof under weight imposed on the platform, and weight indicating means indicating the extent of movement of said lever.

12. In a bathroom type scale, the combination of a base, a sheet metal platform subject to torque distortion when weight is unevenly applied thereon, a wishbone type supporting lever having the two-branched fork thereof disposed under the rear portion of the platform and the arm thereof extending forwardly under the front portion of the platform, transversely aligned fixed fulcrums projecting upwardly from the base and engaged by slings on the rear end of the wishbone lever for full floating support of the lever on the base, transversely aligned fixed fulcrums projecting downwardly from the platform for engagement with other slings on said wishbone lever in forwardly spaced relation to the last named slings, said platform having two other transversely aligned fulcrums projecting downwardly therefrom in forwardly spaced relation to its first named fulcrums but subject to misalignment under torque distortion of the platform, other lever means full-floatingly supported on slings on the base at one end and on other slings on the wishbone lever at the other end, sling means providing floating bearing support for each of the forward fulcrums of said platform on the last-mentioned lever means, weighing spring means operatively connected with the arm of the wishbone lever to resist movement thereof under weight imposed on the platform, and weight indicating means indicating the extent of movement of said lever.

13. In a weighing scale, a base, a platform, a wishbone lever having the two arms thereof disposed under one end portion of the platform and having the middle portion thereof extending longitudinally under the other end portion of the platform, each arm of the wishbone lever having a downwardly facing knife edge on the end thereof and an upwardly facing knife edge in longitudinally spaced relation thereto for engagement on upward and downward fulcrum projections provided on the base and platform, respectively, two floating levers under the platform on opposite sides of the wishbone lever, swingable bearing members swingably supporting one end of the floating levers on the two arms of the wishbone lever, two swingable bearing members on the other end of each of the floating levers in longitudinally spaced relation with respect thereto, upward fulcrum projections on the base having engagement with the endmost swingable bearing members, downward fulcrum projections on the platform having engagement with the other swingable bearing members, counterpoising means operatively connected with the middle portion of the wishbone lever to resist movement thereof under weight imposed on the platform, and weight indicating means indicating the extent of movement of said lever.

14. In a weighing scale, a base, a platform, a wishbone lever having the two arms thereof under one end portion of the platform and the middle portion thereof extending longitudinally under the other end portion of the platform, there being an upward fulcrum projection provided on the base adjacent the end of each of said arms and a downward fulcrum projection on the platform in longitudinally spaced relation to the upward projection, swingable bearing members swingably supporting the ends of the two arms on the upward fulcrum projections on the base, other swingable bearing members swingably supporting the downward fulcrum projections on the platform on the two arms, two floating levers under the platform on opposite sides of the wishbone lever, swingable bearing members swingably supporting one end of the floating levers on the two arms of the wishbone lever, two swingable bearing members on the other end of each of the floating levers in longitudinally spaced relation with respect thereto, upward fulcrum projections on the base having engagement with the endmost swingable bearing members, downward fulcrum projections on the platform having engagement with the other swingable bearing members, counterpoising means operatively connected with the middle portion of the wishbone lever to resist movement thereof under weight imposed on the platform, and weight indicating means indicating the extent of movement of said lever.

15. A portable, hand-carryable weighing scale of the bathroom type, comprising a base of light weight material and shallow configuration, a weight receiving platform over said base constructed of light weight material having depending side walls enclosing said base so that the scale when lifted and carried is taken hold of mainly by the platform, weighing mechanism comprising substantially horizontally extending lever means having knife-edged fulcrum portions for support thereof on said base, and having other knife-edged fulcrum portions for supporting said platform on said lever means, the first named knife-edged fulcrum portions being in unsecured relation to said base, and the second named knife-edged fulcrum portions being in unsecured relation to said platform, yielding means operatively connected to resist tilting movement of said lever means under weight applied on said platform, weight indicating means operable in response to movement of said lever means, and tension spring means interconnecting the platform and base under tension so as to hold the platform resiliently in operative relation to said lever means under substantially uniform pressure and also hold the scale assembly as a whole intact when the scale is lifted by its platform, said spring means being the sole means for holding said platform and base together with the knife edges of the fulcrum portions of said lever means held resiliently in constant engagement with the base and platform, respectively.

JOHN C. SUTTON.